(12) United States Patent
Huang et al.

(10) Patent No.: US 10,270,192 B2
(45) Date of Patent: Apr. 23, 2019

(54) CABLE CONNECTOR ASSEMBLY

(71) Applicant: FOXCONN INTERCONNECT TECHNOLOGY LIMITED, Grand Cayman (KY)

(72) Inventors: Shuai-Hui Huang, Kunshan (CN); Hai-Li Wang, Kunshan (CN); Ru-Yang Guo, Kunshan (CN); Qing-Man Zhu, Kunshan (CN); Jerry Wu, New Taipei, CA (US)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 15/849,613

(22) Filed: Dec. 20, 2017

(65) Prior Publication Data
US 2018/0175526 A1    Jun. 21, 2018

(30) Foreign Application Priority Data

Dec. 20, 2016 (CN) .................... 2016 2 1400395 U

(51) Int. Cl.
*G02B 6/122* (2006.01)
*H01R 12/70* (2011.01)
*H01R 12/71* (2011.01)
*H01R 12/75* (2011.01)
*H01R 13/717* (2006.01)
(Continued)

(52) U.S. Cl.
CPC ....... *H01R 12/707* (2013.01); *H01R 12/7052* (2013.01); *H01R 12/7064* (2013.01); *H01R 12/716* (2013.01); *H01R 12/75* (2013.01); *H01R 13/6581* (2013.01); *H01R 13/7172* (2013.01); *G02B 6/122* (2013.01); *H01R 13/6594* (2013.01)

(58) Field of Classification Search
CPC .............. H01R 12/707; H01R 12/7052; H01R 12/7064; H01R 12/716; H01R 12/75; H01R 13/6581; H01R 13/6594; H01R 13/717; H01R 13/7172; H01R 13/7175; G02B 6/122
See application file for complete search history.

(56) References Cited

U.S. PATENT DOCUMENTS

| 7,086,866 B1 * | 8/2006 | Folan ................... H01R 12/716 439/108 |
| 7,753,689 B1 * | 7/2010 | Wu ....................... H01R 13/648 439/490 |

(Continued)

*Primary Examiner* — Edwin A. Leon
*Assistant Examiner* — Oscar C Jimenez
(74) *Attorney, Agent, or Firm* — Wei Te Chung; Ming Chieh Chang

(57) ABSTRACT

A cable connector assembly includes: an insulative housing; a printed circuit board (PCB) received in the insulative housing, the PCB having an upper surface; an electrical connector electrically connected with the PCB; a cable; a light member mounted on the PCB; a light guide member mounted on the PCB; and a shading member covered on the light guide member; wherein the electrical connector includes plural conductive terminals and plural fixing fingers fixed on the PCB, the PCB includes plural conductive pads exposed on the upper surface of the PCB and fixed with the conductive terminals and plural mounting holes on the upper surface of the PCB and matched with the fixing fingers.

14 Claims, 8 Drawing Sheets

(51) Int. Cl.
*H01R 13/6581* (2011.01)
*H01R 13/6594* (2011.01)

(56) References Cited

U.S. PATENT DOCUMENTS

| | | | | |
|---|---|---|---|---|
| 8,206,019 | B2* | 6/2012 | Chen | G02B 6/0008 |
| | | | | 362/581 |
| 8,221,160 | B2* | 7/2012 | Liu | H01R 13/6596 |
| | | | | 439/540.1 |
| 9,017,092 | B1* | 4/2015 | McCracken | H01R 13/62 |
| | | | | 439/374 |
| 9,257,800 | B2* | 2/2016 | Huang | H01R 12/61 |
| 9,480,169 | B2* | 10/2016 | Huang | H01R 13/504 |
| 9,520,683 | B2 | 12/2016 | Qian et al. | |
| 9,705,263 | B2* | 7/2017 | Huang | H01R 13/7175 |
| 9,728,915 | B2* | 8/2017 | Aldehayyat | H01R 24/58 |
| 9,772,090 | B2* | 9/2017 | Huang | H01R 13/447 |
| 9,780,503 | B2* | 10/2017 | Huang | H01R 13/5213 |
| 2007/0238364 | A1* | 10/2007 | Kuo | H01R 13/6691 |
| | | | | 439/630 |
| 2015/0214677 | A1* | 7/2015 | Huang | H01R 13/7175 |
| | | | | 439/39 |

\* cited by examiner

CABLE CONNECTOR ASSEMBLY

BACKGROUND OF THE INVENTION

1. Field of the Invention

The present disclosure relates to a cable connector assembly of a firm structure.

2. Description of Related Arts

U.S. Pat. No. 9,780,503 discloses a plug connector assembly for mating with a complementary connector. The plug connector assembly includes a plug connector and a cable connecting with the plug connector. The plug connector includes an insulative shell having a receiving space, a printed circuit board received in the insulative shell, a mating member mounted on the insulative shell and electrically connecting with the printed circuit board, and a light guide transmitting the light of a light member. The printed circuit board has a plurality of mounting holes. The mating member has a plurality of conductive terminals vertically inserted into the mounting holes and fixed on the printed circuit board by welding.

An improved cable connector assembly making a better use of its internal printed circuit board is desired.

SUMMARY OF THE INVENTION

Accordingly, an object of the present invention is to provide a cable connector assembly with a firm structure and improved layout.

To achieve the above object, a cable connector assembly comprises: an insulative housing; a printed circuit board (PCB) received in the insulative housing, the PCB having an upper surface; an electrical connector electrically connected with the PCB; a cable; a light member mounted on the PCB; a light guide member mounted on the PCB; and a shading member covered on the light guide member; wherein the electrical connector includes plural conductive terminals and plural fixing fingers fixed on the PCB, the PCB includes plural conductive pads exposed on the upper surface of the PCB and fixed with the conductive terminals and plural mounting holes on the upper surface of the PCB and matched with the fixing fingers.

Other objects, advantages and novel features of the invention will become more apparent from the following detailed description when taken in conjunction with the accompanying drawings.

DETAILED DESCRIPTION OF THE PREFERRED EMBODIMENT

Figure 1:
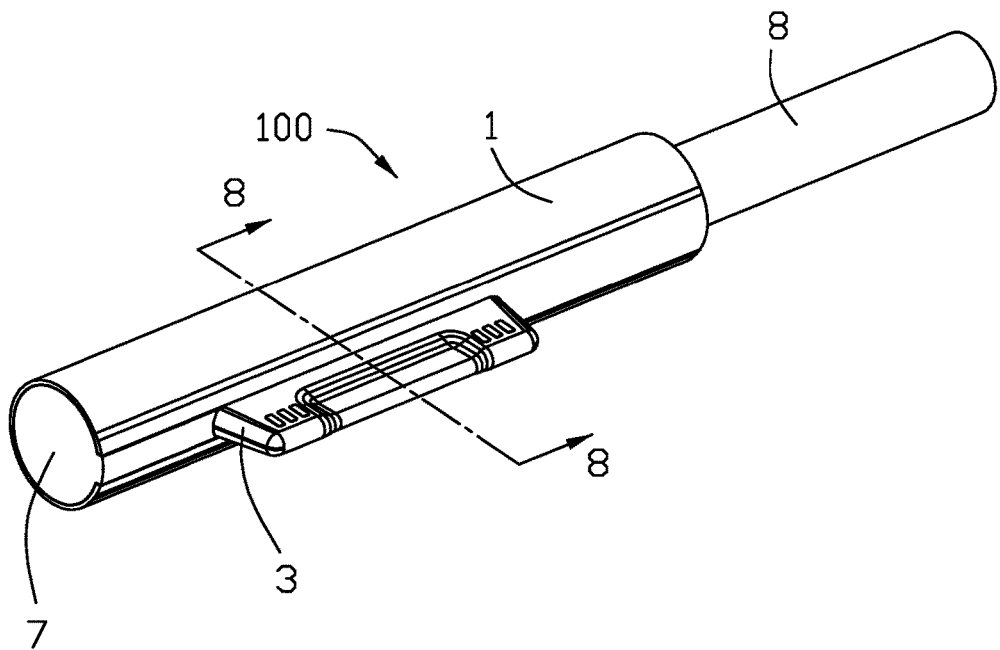
FIG. 1 is a perspective view of a cable connector assembly.
Figure 2:
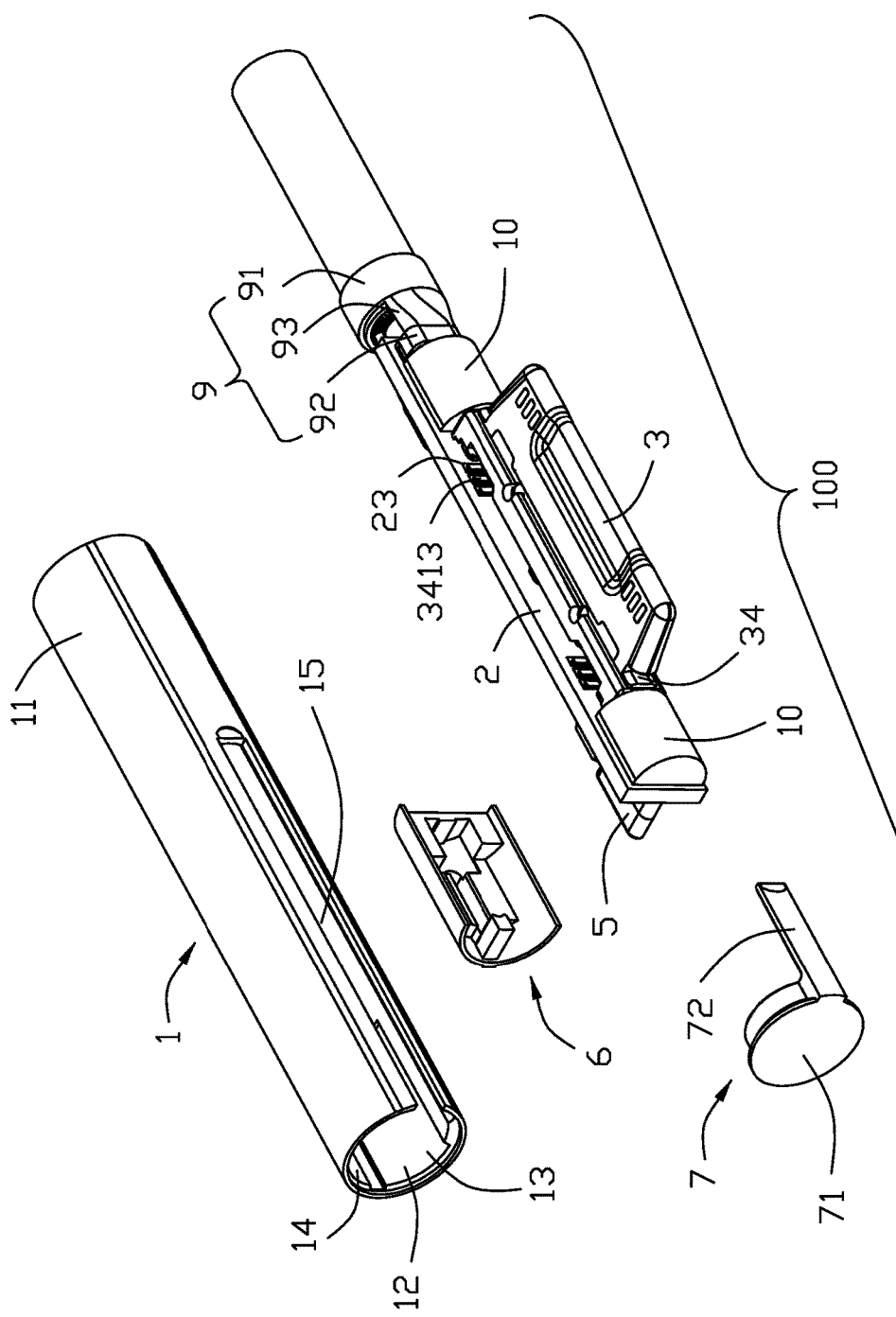
FIG. 2 is a partial exploded view of cable connector assembly as show in FIG. 1.
Figure 3:
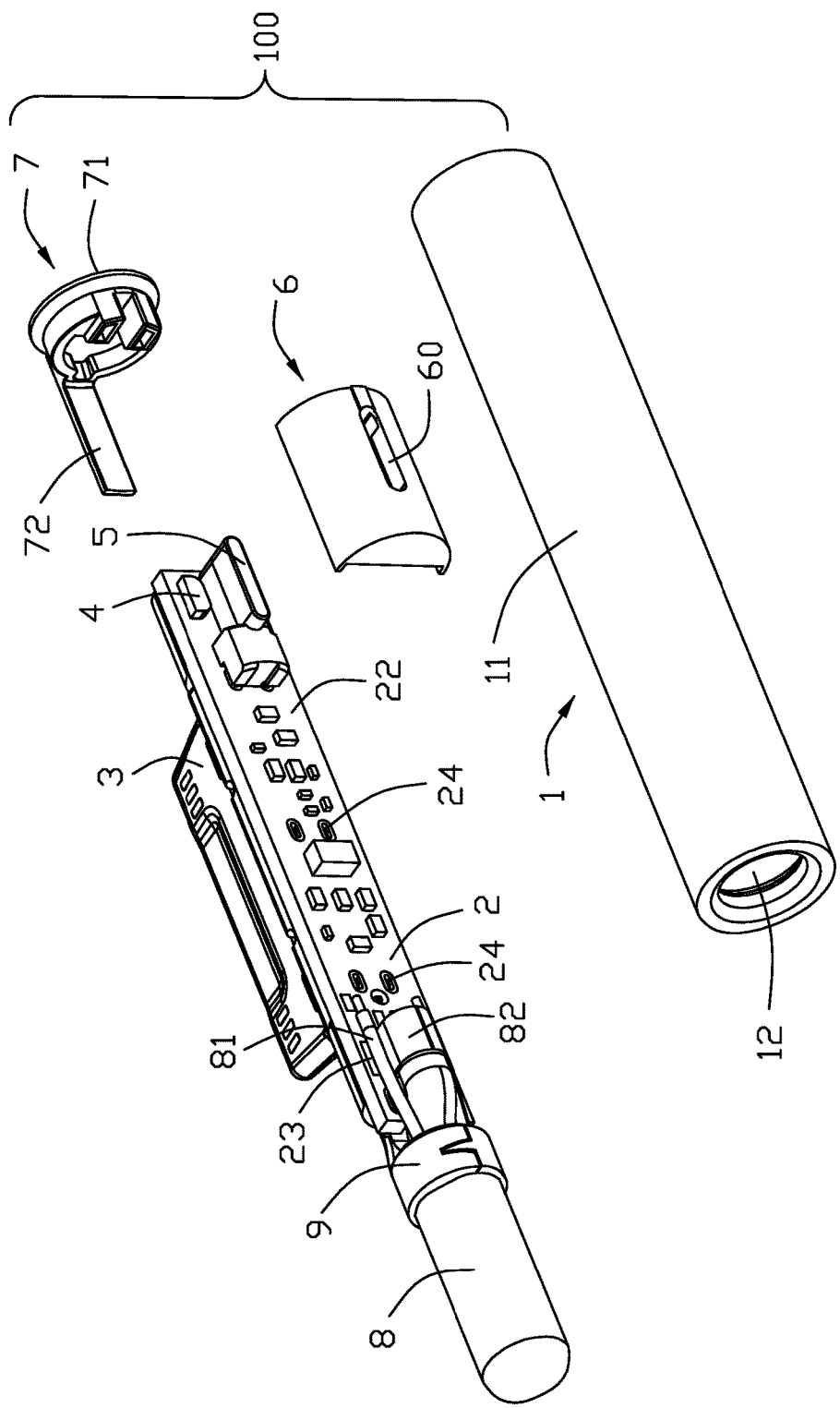
FIG. 3 is another exploded view of cable connector assembly as shown in FIG. 2.
Figure 4:
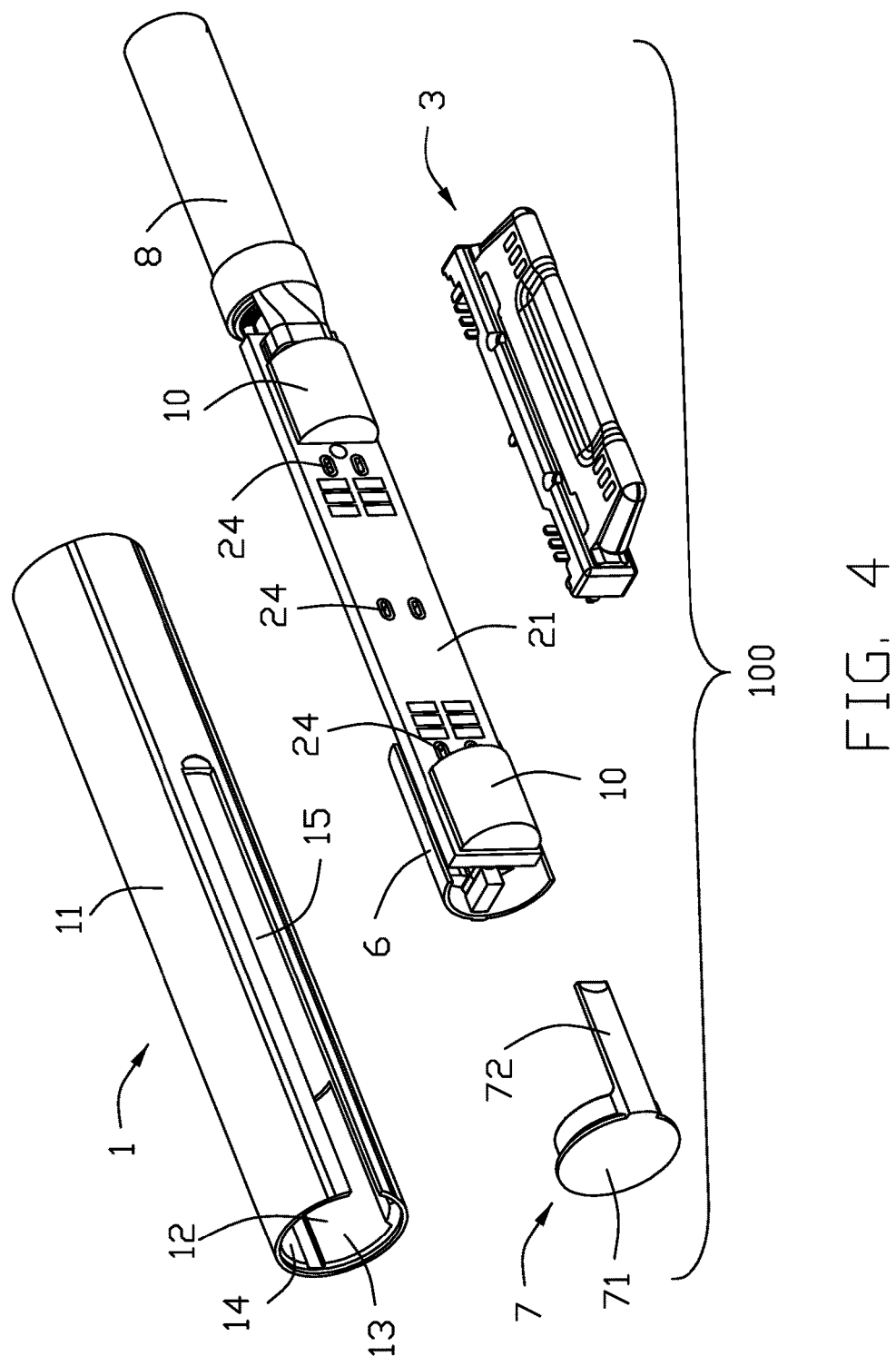
FIG. 4 is a partial exploded view of cable connector assembly as shown in FIG. 1.
Figure 5:
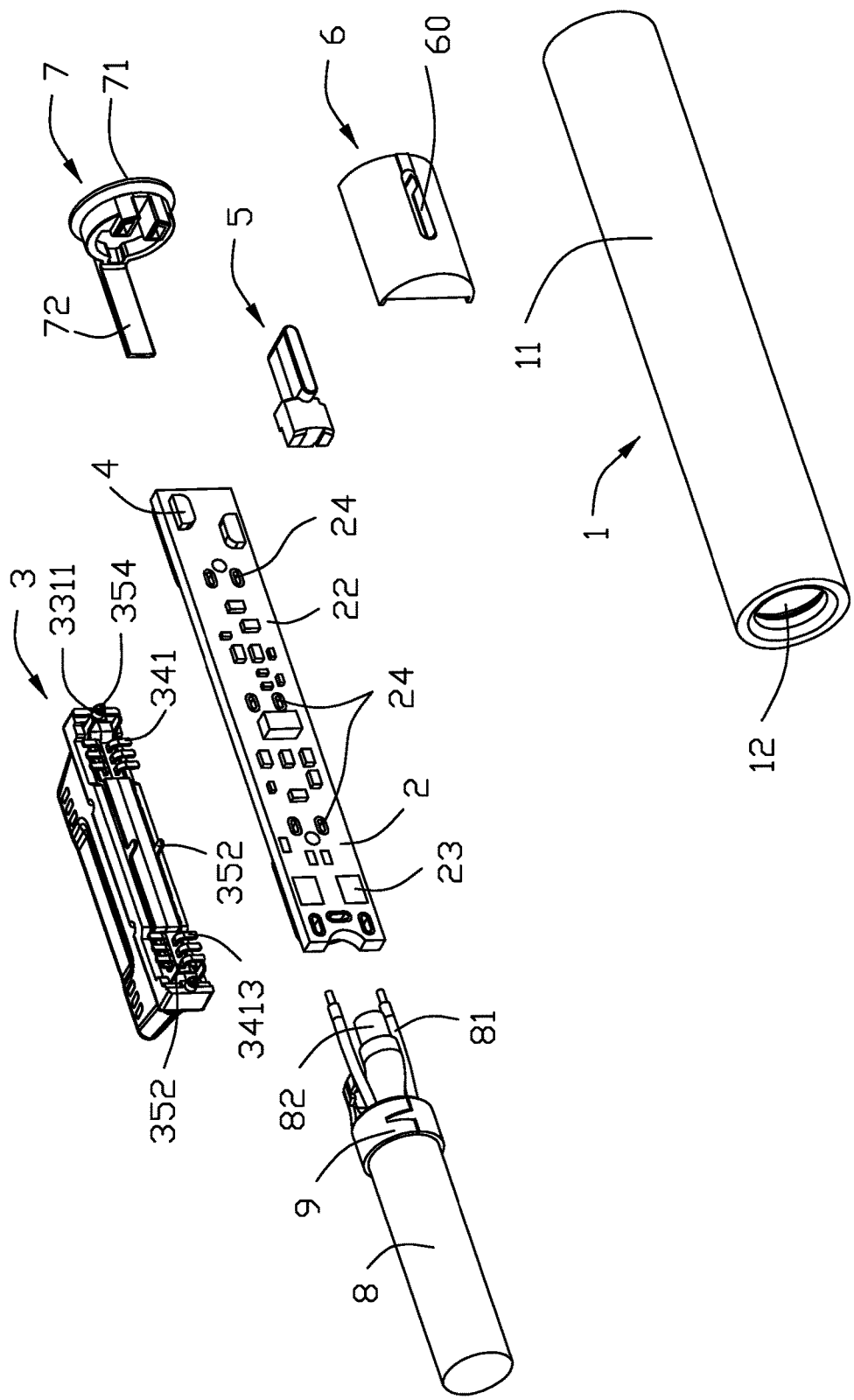
FIG. 5 is a further exploded view of cable connector assembly as shown in FIG. 3.

Reference will now be made in detail to the preferred embodiment of the present invention.

Referring to FIGS. 1 to 5, a cable connector assembly 100 includes an insulative housing 1, a printed circuit board (PCB) 2 received in the insulative housing/case 1, an electrical connector 3 electrically connected with PCB 2, a light member 4 mounted on the PCB 2, magnetic elements 10 mounted on the PCB 2, a light guide member 5, a shading member 6 covered on the light guide member 5, a front plug 7 held in light guide member 5, and a cable 8 electrically connected with the rear end of the PCB 2, and a metal ring 9 assembled on the front end of the cable 8.

The insulative housing/case 1 is cylindrical to define an axial direction, and includes a housing body 11, a receiving cavity 12 enclosed by housing body 11, a light transmitting area 13 mounted on the housing body 11, a port 14 mounted on the front end of the housing body 11, and a channel 15 formed by extending port 14 backwards. The thickness of the light transmitting area 13 is smaller than that of the other parts of the insulative housing 1.

The PCB 2 is mounted in the receiving cavity 12 and includes an upper surface 21 and a lower surface 22 opposite to the upper surface 21, a plurality of conductive pads 23 electrically connected with the electrical connector 3 and a plurality of mounting holes 24 mated with the electrical connector 3. Two magnetic elements 10 and electrical connector 3 are mounted on the upper surface 21 of the PCB 2, and two magnetic elements 10 are located on both sides of the electric connector 3 in the longitudinal. The light member 4 and light guide member 5 are mounted on the lower surface 22 of the PCB 2 and away from one end of cable 8. In this embodiment, the conductive pads 23 are divided into two groups in the left and right ends, and each group has six parts in two rows. The mounting hole 24 is divided into three groups, and two of each group are respectively distributed in the left, right ends and the middle of the two groups of conductive pads 23. In other embodiment, the quantity and arrangement of the conductor pads 23 and the mounting hole 24 can be adjusted according to the actual situation.

The light member 4 is mounted on the front area of the lower surface 22. In this embodiment, the light member 4 is a light emitting diode (LED). In other embodiment, the light member 4 can be used as other light emitting element. The light emitted by the light member 4 is transmitted to the light transmitting area 13 of the insulative housing 1 by the light guide member 5. The shading member 6 includes a light transmitting hole 60 providing part of the light guide member 5 through.

The front plug 7 is mounted on the insulative housing 1 to seal the port 11, and cooperated with the electrical connector 3 to seal the channel 13. The front plug 7 comprises a main portion 71 for being mated with the port 11, and an extending portion 72 extending from the main portion 71 with a free end interference fitting with one of the recesses 34. The extending portion 72 is cooperated with the electrical connector 3 to seal the channel 13.

The cable 8 is connected to the back end area of the PCB 2. In this embodiment, the cable 8 is welded on the conductive pads 23 of the PCB 2. The cable 8 includes a power wire 82 and signal wires 81 located on both sides of the power wire 82. The metal ring 9 includes a fixing ring 91 outside the cable 8, a positioning portion 92 vertically welded on the PCB 2 and a connect plate 93 connecting the positioning portion 92 and fixing ring 91.

Figure 6:
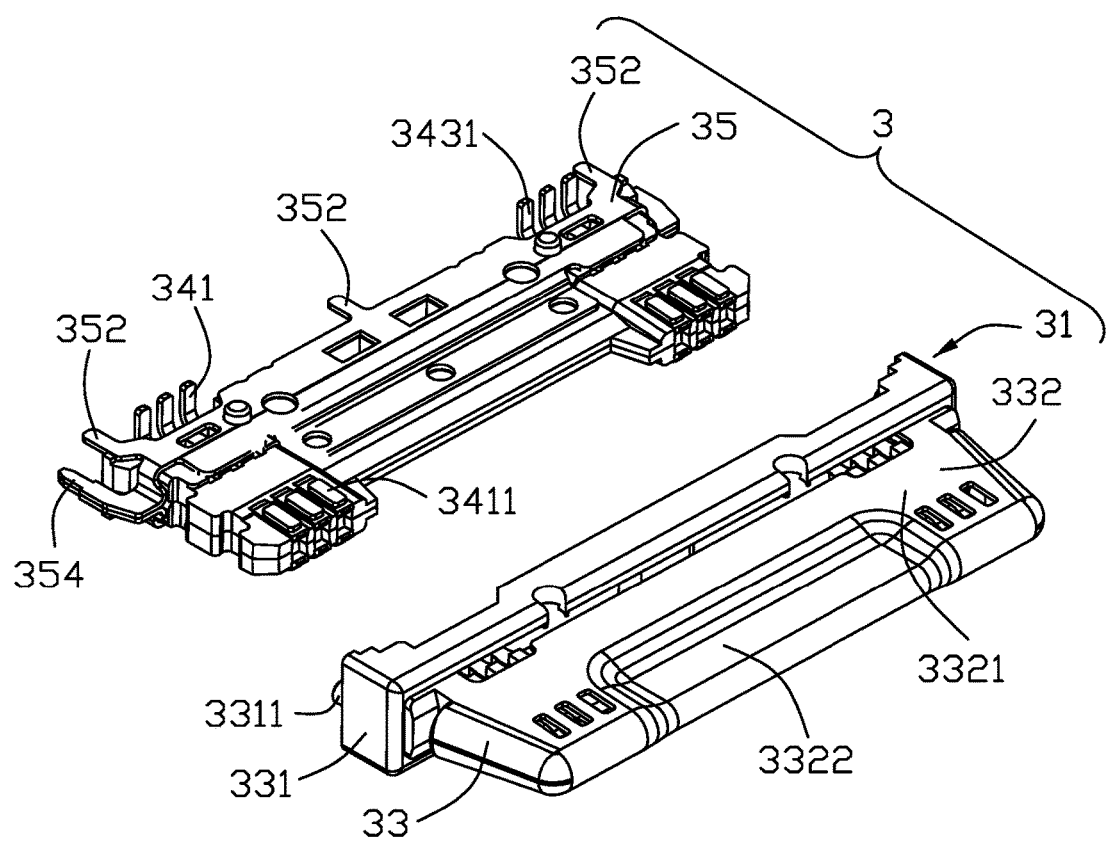
FIG. 6 is a partial exploded view of electrical connector in this invention.
Figure 7:
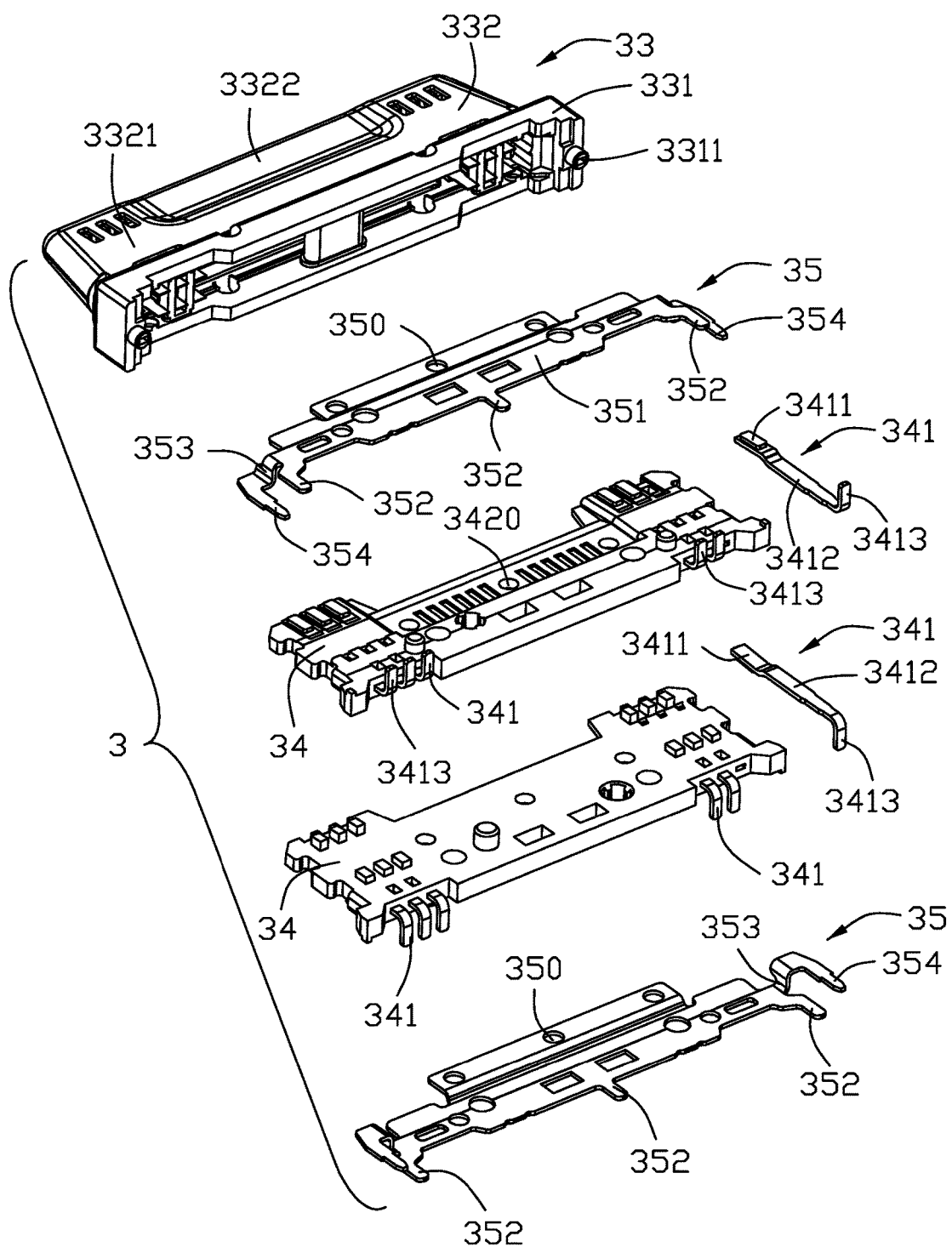
FIG. 7 is a further exploded view of electrical connector as shown in FIG. 6.
Figure 8:
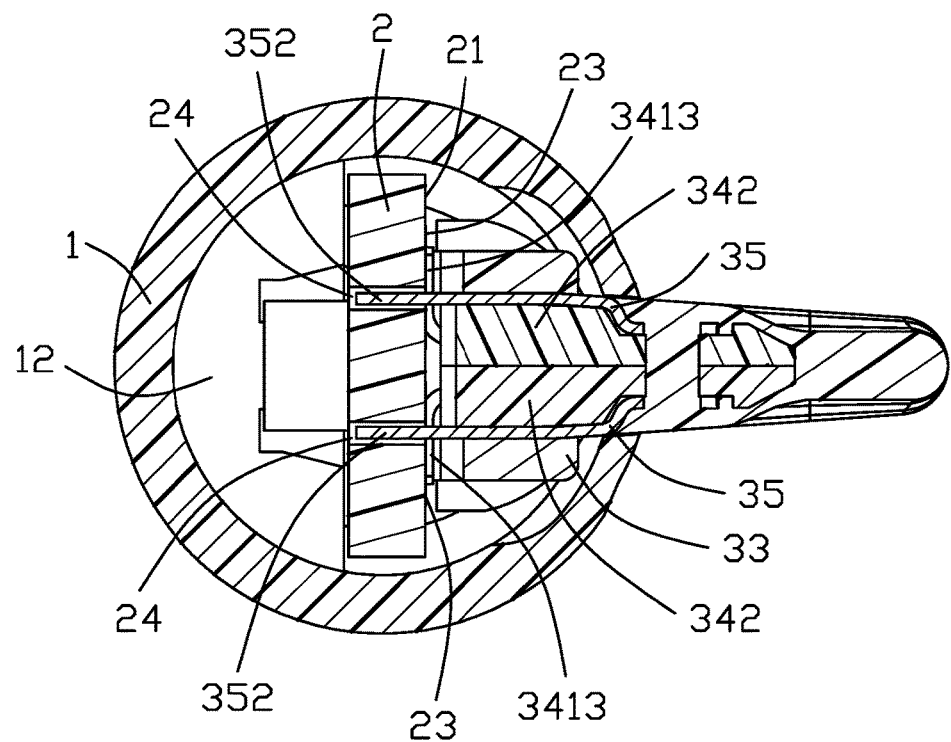
FIG. 8 is a cross-sectional view of the cable connector assembly tacked along line 8-8 of FIG. 1.

Referring to FIGS. 6 to 7, the electrical connector 3 includes housing 33, two terminal modules 34 mounted in the electrical connector 3 and two metal strengthening members or shields 35. Two terminal modules 34 are set up and down separately and fixed together with each other. Two metal strengthening members 35 are separately assembled on the outer surface of the corresponding terminal module 34. The housing 33 is formed out of terminal module 34 and metal strengthening members by coating/over molding, and the housing 33 is made of plastic material. The formed housing 33 includes a base 331 and a mating portion 332 forward protruding from the front end of the base 331. The mating portion 332 extends along a front and back direction and forms a longitudinal structure along the left and right direction, i.e., the housing 33 is molded to the two terminal modules 34 and the metal strengthening members 35 to form the base 331 and the mating portion 332 and therefore the electrical connector 3.

Each of terminal modules 34 includes an insulating protrusion 342 and a row of conductive terminals 341 enclosed in the insulating protrusion 342. In this embodiment, the conductive terminals 341 are formed in the insulating protrusion 342 by an insertion type coating. Each row of conductive terminals 341 includes six conductive terminals 341 and divided into two groups in the left and right ends. Each of the conductive terminals 341 includes a contact section 3411 exposed to the mating portion 332, a tail section 3413 backward extending from the housing 33, and a connecting section 3412 connecting the contact section 3411 and the tail section 3413. The insulating protrusion 342 is molded on the connecting section 3412 with the contact section 3411 and the tail section 3413 exposed. The tail section 3413 is perpendicular to the connection section 3412. The bottom of the tail section 3413 is parallel to the upper surface 21 of the PCB 2, and the bottom of the tail section 3413 is fitted to the conductive pads 23 on the upper part of the PCB 2. The tail section 3413 of conductive terminals 341 is respectively mounted on the corresponding conductive pads 23 of the PCB 2 by SMT process. A single side welding is carried out through the SMT reflow welding, and the conductive terminals 341 are fixed to the PCB 2 to realize the positioning of the electrical connector 3 and the PCB 2. The outer surface of the contact section 3411 is flat or coplanar with the mating surface 3321. Of course, in other embodiment, the outer surface of the contact section 3411 can also protrude and extend the mating surface 3321. The mating surface 3321 is an inward recesses 3322 arranged in parallel with the contact section 3411, and the contact section 3411 symmetrically arranged on the left and right sides of the contact section 3411 of the mating surface 3321. In each row of the contact section 3311, each three forms a group forming a total of two groups and symmetrically locates on the left and right sides of the recesses 3322.

The metal strengthening members 35 are pasted on the outer surface of the corresponding terminal modules 34, and have an opening 350 corresponding to the injection hole 3420 of the terminal module 34, so as to provide good retention effect when the housing 33 is directly injected into the terminal modules 34. Each of the metal strengthening members 35 include main body 351 in longitudinal direction, a plurality of fixing fingers 352 downward extending from the main body 351. The fixing fingers 352 is inserted into the mounting hole 24 of the PCB 2 and fixed on the PCB 2 through welding, so as to further achieve the location between the electric connector 3 and the PCB 2, and at the same time, achieve the grounding effect. In the present invention, each of the metal strengthening members 35 include three fixing fingers 352 at the left, right ends and the middle of the conductive terminals 341 for achieving the best fixed effect, and the fixing fingers 352 is arranged on a plane to facilitate welding. In other embodiment, the position and quantity of the fixing fingers 352 can also be adjusted according to the actual situation. In another embodiment, the fixing fingers 352 can also be mounted on the other component of the electrical connector 3, such as the bottom of the housing 33 or terminal module 34 through the fixing fingers 352 matched with the corresponding part of the PCB 2 to achieve the fixation. The main body 351 is attached to the surface of the insulating protrusion 342 in the terminal module 34 to strengthen the overall strength of the electrical connector 3; while the fixing fingers 352 is used to be fixed on the PCB 2 so that the electrical connector 3 can be fixed more steadily on the PCB 2.

The two longitudinal ends of the main body 351 of the metal strengthening members 35 include inwardly bent connecting portions 353 and positioning pins 354 extending downward from the connecting portion 353. The connecting portions 353 of two metal strengthening members 35 are bent toward each other so that the positioning pins 354 of the two are abutted against each other and stacked with each other. In this invention, the positioning pins 354 are abutted against each other are not welded and fixed together, while in other embodiment, two adjacent positioning pins 354 may also be welded and fixed together by spot welding, soldering or the like so as to improve the fixing effect of the metal strengthening members 35 on the terminal modules 34. When the housing 33 is injection-molded, the positioning post 3311 of the housing 33 is enclosing the positioning pins 354 of the metal strengthening members 35 so that the positioning post 3311 of the housing 33 can have a higher strength, also the positioning post 3311 is fixed on the PBC 2 and subjected to an impact that the positioning post 3311 is not prone to fracture. In this embodiment, the positioning pins 354 do not protrude from the positioning posts 3311, while in other embodiment, the positioning pins 354 can protrude from the positioning posts 3311 so that the positioning post 3311 can be positioned during the boarding operation. After the boarding, the positioning pins 354 are soldered with the PCB 2 to increase the resistance of the electrical connector 3 grip force.

In this invention, six conductive terminals 341 of the electrical connector 3 are respectively soldered on the PCB 2 by SMT (Surface Mount Technology). It not only achieves the positioning between the electrical connector 3 and the PCB 2, but also to save more space on the small PCB for the layout of the PCB design and the placement of the electronic components. At the same time, the electrical connector 3 includes a plurality of fixing fingers 352 inserted into the mounting holes 24 of the PCB 2 and fixed to the PCB 2 by welding to further reinforce the holding force between the electrical connector 3 and the PCB 2 to ensure axial retention and law phase shear. In the preferred embodiment, by distributing the fixing fingers 352 on the left and right ends and the middle of the bottom of the electrical connector 3, the distribution is evenly distributed so as to achieve the best holding effect. This invention adopts two different welding methods to position the electrical connector 3 and the PCB 2 in different positions to achieve the best retention effect. The power cord 82 is centered, and the signal line 81 is disposed on the left and right of the power cord 82 and the fixing leg 352 is soldered directly to the PCB to achieve grounding in this invention. It is simple to manufacture and the structure is compact.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. A cable connector assembly comprising: an insulative housing; a printed circuit board (PCB) received in the insulative housing, the PCB having an upper surface; an electrical connector electrically connected with the PCB; a cable; a light member mounted on the PCB; a light guide member mounted on the PCB; and a shading member covered on the light guide member; wherein the electrical connector includes a plurality of conductive terminals and a plurality of fixing fingers fixed on the PCB, the PCB includes plural conductive pads exposed on the upper surface of the PCB and fixed with the conductive terminals and plural mounting holes on the upper surface of the PCB and matched with the fixing fingers; wherein the conductive terminal includes a tail section welded on the conductive pad by SMT process, and the fixing fingers are received in the mounting holes and welded on the PCB; wherein an extending direction of the fixing finger is perpendicular to an extending direction of the tail section; wherein the conductive pads are divided into two groups in a left and right ends, and the mounting holes are divided into three groups and distributed in a left end, right end, and a middle of the two groups of conductive pads.

2. The cable connector assembly as claimed in claim 1, further comprising plural magnetic elements mounted on the PCB, a front plug held in the light guide member, and a metal ring assembled on the front end of the cable, the metal ring including a fixing ring outside the cable and a positioning portion welded on the PCB.

3. A cable connector assembly comprising:
a housing defining an axial direction thereof;
a printed circuit board (PCB) received in the housing and having opposite upper and bottom surfaces in a mating direction;
a light member mounted upon the bottom surface;
a light guiding member located on the bottom surface and adjacent to the light member;
a cable mechanically and electrically connected to one end of the PCB along an axial direction perpendicular to the mating direction; and
an electrical connector mounted upon the upper surface of the PCB and including an insulative housing associated with a metallic shield to retain two groups of contacts which are located around two opposite end regions of the insulative housing in said axial direction; wherein
said contacts are surface-mounted upon the upper surface of the PCB while the metallic shield has two groups of fixing finger located at two opposite ends thereof along the axial direction to extend through corresponding holes in the PCB in a direction opposite to the mating direction.

4. The cable connector assembly as claimed in claim 3, wherein the metallic shield is covered behind the insulative housing in a vertical direction perpendicular to both the axial direction and the mating direction.

5. The cable connector assembly as claimed in claim 3, wherein the housing further includes a pair of positioning posts at two opposite ends along the axial direction to be received within a pair of corresponding through holes in the PCB.

6. The cable connector assembly as claimed in claim 5, wherein said metallic shield further includes a pair of positioning pins at said two opposite ends, and said pair of positioning pins are inserted into the positioning posts, respectively.

7. The cable connector assembly as claimed in claim 3, wherein the metallic shield has an additional fixing finger at a center position in the axial direction.

8. The cable connector assembly as claimed in claim 3, wherein the light member is located upon the other end of the PCB opposite to the cable in said axial direction.

9. The cable connector assembly as claimed in claim 3, wherein the connector includes two terminal modules to retain the two groups of contacts.

10. The cable connector assembly as claimed in claim 9, wherein said metallic shield includes two pieces respectively associated with the two terminal modules.

11. A cable connector assembly comprising: an insulative housing; a printed circuit board (PCB) received in the insulative housing, the PCB having an upper surface; an electrical connector electrically connected with the PCB; a cable; a light member mounted on the PCB; a light guide member mounted on the PCB; and a shading member covered on the light guide member; wherein the electrical connector includes a plurality of conductive terminals and a plurality of fixing fingers fixed on the PCB, the PCB includes plural conductive pads exposed on the upper surface of the PCB and fixed with the conductive terminals and plural mounting holes on the upper surface of the PCB and matched with the fixing fingers; wherein the electrical connector includes a housing receiving the conductive terminals and a plurality of metal strengthening members enclosed in the housing, the metal strengthening members including a main body and a plurality of fixing fingers extending downward from the main body.

12. The cable connector assembly as claimed in claim 11, wherein the electrical connector includes two metal strengthening members, each of the metal strengthening members having three fixing fingers.

13. The cable connector assembly as claimed in claim 11, wherein the housing includes a base and a frontal mating portion, the mating portion has a mating surface along a front and back direction, and the conductive terminal includes a contact section exposed to the mating portion.

14. The cable connector assembly as claimed in claim 13, wherein the electrical connector includes a housing and an insulating protrusion receiving the conductive terminals, and the metal strengthening members are attached to an outer surface of the insulating protrusion.

* * * * *